April 5, 1949.    W. SAVILATZ    2,466,559
DEVICE TO AID IN THE PLOTTING OF CURVES
Filed May 10, 1945
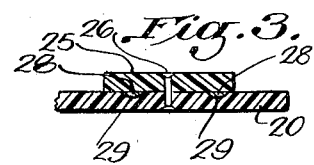
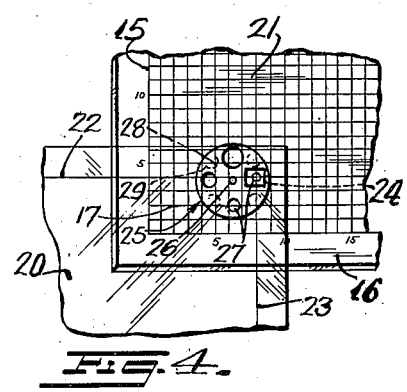
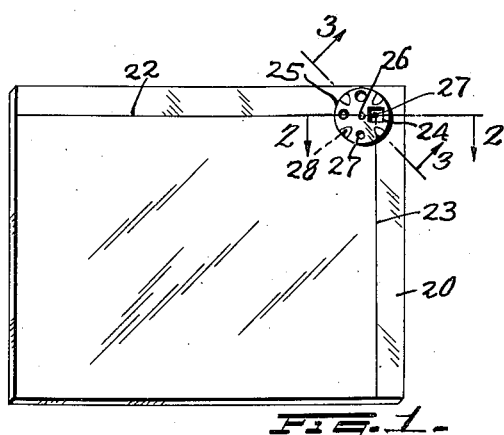
INVENTOR.
WILLIAM SAVILATZ
BY
ATTORNEY.

Patented Apr. 5, 1949

2,466,559

UNITED STATES PATENT OFFICE 2,466,559

DEVICE TO AID IN THE PLOTTING OF CURVES

William Savilatz, New York, N. Y.

Application May 10, 1945, Serial No. 592,978

5 Claims. (Cl. 33—1)

This invention relates to new and useful improvements in a device to aid in the plotting of curves.

More specifically, the invention proposes the construction of a device constructed to be used in connection with graph paper as an aid to plotting curves thereon, and more specifically, to relieve the eye strain which generally accompanies the problem of locating the points on the graph paper which are to act as a guide in drawing the line.

Still further the invention proposes the construction of a device formed of transparent sheet material and provided with a line adapted to be placed parallel to the axis of the ordinates and a line adapted to be placed parallel to the axis of the abscissa of the graph paper and provided at the junction of these lines with an aperture through which a marking instrument is adapted to be inserted to mark a point on the graph paper at the converging point of the desired quantity values on the axis of the ordinates and the axis of the abscissa.

Still another object of the invention proposes forming the aid of transparent sheet material, so that when it is positioned on the graph paper that portion of the graph paper which is covered thereby may be easily viewed.

Another object of the invention proposes the construction of an aid designed in a manner to permit the size of the opening on the junction of the lines to be varied for receiving marking instruments of different diameters.

It is a further object of this invention to construct a device to aid in the plotting of curves which is simple and durable and which may be manufactured and sold at a reasonable cost.

For further comprehension of the invention, and of the objects and advantages thereof, reference will be had to the following description and accompanying drawings, and to the appended claims in which the various novel features of the invention are more particularly set forth.

In the accompanying drawing forming a material part of this disclosure:

Fig. 1 is a perspective view of a device to aid in the plotting of curves constructed in accordance with this invention.

Fig. 2 is a partial vertical sectional view taken on the line 2—2 of Fig. 1.

Fig. 3 is a partial vertical sectional view taken on the line 3—3 of Fig. 1.

Fig. 4 is a partial plan view illustrating the manner of using the plotting device of the present invention.

The device to aid in the plotting of curves, according to this invention, includes a transparent sheet 20 which is adapted to be placed upon a piece of graph paper 21 as shown in Fig. 4. The transparent sheet 20 is inscribed with two lines 22 and 23 at right angles to each other and placed slightly inwards from two adjacent edges of the transparent sheet 20. At the point of juncture of the lines 22 and 23 the transparent sheet 20 is formed with an aperture 24.

The sheet of graph paper 21 is of conventional construction and has an axis of ordinates 15 and the axis of abscissa 16. Quantity values of money, time, articles or other similar values are adapted to be indicated along the axis of ordinates 15 and the axis of the abscissa 16. In using the aid as a guide to plotting a curve on the graph paper 21 the transparent sheet 20 is positioned thereon with the aperture 24 in the area outlined by the axis of the ordinates 15 and the axis of the abscissa 16.

The line 22 of the transparent sheet 10 is then extended parallel to the axis of the abscissa 16 at a given quantity value along the axis of the ordinates 15. The line 23 is then extended parallel to the axis of ordinates 15 at a given quantity value along the axis of abscissa 16. This positioning of the transparent sheet 20 will locate the aperture 24 at a junction point of the values engaged by the lines 22 and 23 along the axis of ordinates 15 and the axis of abscissa 16. A marking instrument may then be projected through the opening 24 to locate the point indicated thereby by making a mark 17 on the graph paper 21. It is apparent that using the lines 22 and 23 of the transparent sheet 20 to assist in plotting the points on the graph eliminates eye strain in finding these points and greatly facilitates the operation at a great saving of time to the person making the graph. This manner of positioning the aid upon the graph paper and marking the points of the graph through the aperture 24 is continued until all of the points of a desired graph are located on the graph paper, and then these points are joined by a continuous line to complete the formation of the graph.

Means is provided for controlling the operative size of the aperture 24, and this means comprises disc 25 rotatively supported by means of a rivet 26 upon a transparent sheet 20 to have an edge portion engaged over the enlarged aperture 24. This disc 25 is formed with a plurality of apertures 27 each of a different size and are adapted to be selectively aligned with the junction point of the lines 22 and 23 permitting the marking instrument to be inserted through aligned apertures 24 and 27 to mark a point on the graph paper 21 at the junction of the lines 22 and 23. The openings 27 being of different sizes to permit different size marking instruments to be engaged through these openings for making a mark at the proper location.

Means is provided for releasably holding the disc 25 in a proper position in which the desired aperture 27 will be located exactly at the junction of the lines 22 and 23. This means comprises downwardly extending projections 28 formed on the bottom face of the disc 25 and engageable with complementary recesses 29 formed in the adjacent face of the transparent sheet 20.

While I have illustrated and described the preferred embodiment of my invention, it is to be understod that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A device to aid in the plotting of curves, comprising a transparent sheet adapted to be placed upon graph paper and inscribed with two lines at right angles to each other to be placed parallel to the axis of ordinates and the axis of abscissa of the graph paper and having an aperture at the junction of said lines for a marking instrument, and means for controlling the operative size of said aperture to receive marking instruments of different sizes.

2. A device to aid in the plotting of curves, comprising a transparent sheet adapted to be placed upon graph paper and inscribed with two lines at right angles to each other to be placed parallel to the axis of ordinates and the axis of abscissa of the graph paper and having an aperture at the junction of said lines for a marking instrument, and means for controlling the operative size of said aperture to receive marking instruments of different sizes, said means comprising a disc formed with a plurality of differently sized apertures and rotatively supported upon said transparent sheet.

3. A device to aid in the plotting of curves on graph paper, comprising a transparent sheet for placement on the graph papers, two lines marked on said sheet at right angles to each other to be placed parallel to the axis of ordinates and the axis of abscissa of the graph paper, said sheet being formed with an aperture at the junction of said lines for the passage of a marking instrument, and means for varying the operative size of said aperture, said means comprising a disc rotatively mounted on said sheet to have an edge portion overlie said aperture in all rotative positions of said disc, said disc being formed with a plurality of different sized apertures selectively alignable with the aperture of said sheet in various rotative positions of said disc.

4. A device to aid in the plotting of curves on graph paper, comprising a transparent sheet for placement on the graph paper, two lines marked on said sheet at right angles to each other to be placed parallel to the axis of ordinates and the axis of abscissa of the graph paper, said sheet being formed with an aperture at the junction of said lines for the passage of a marking instrument, and means for varying the operative size of said aperture, said means comprising a disc of said aperture, said means comprising a disc rotatively mounted on said sheet to have an edge portion overlie said aperture in all rotative positions of said disc, said disc being formed with a plurality of different sized apertures selectively alignable with the aperture of said sheet in various rotative positions of said disc, and means for releasably retaining said disc in a rotative position in which one of its apertures is aligned with the aperture of said sheet.

5. A device to aid in the plotting of curves on graph paper, comprising a transparent sheet for placement on the graph paper, two lines marked on said sheet at right angles to each other to be placed parallel to the axis of ordinates and the axis of abscissa of the graph paper, said sheet being formed with an aperture at the junction of said lines for the passage of a marking instrument, and means for varying the operative size of said aperture, said means comprising a disc rotatively mounted on said sheet to have an edge portion overlie said aperture in all rotative positions of said disc, said disc being formed with a plurality of different sized apertures selectively alignable with the aperture of said sheet in various rotative positions of said disc, said sheet being formed beneath said disc with a circular group of spaced recesses arranged concentric with the rotative point of said disc, and a projection extending from the bottom face of said disc and selectively engageable with one of said recesses for holding said disc in a rotative position in which one of its apertures will be aligned with the aperture of said sheet.

WILLIAM SAVILATZ.

REFERENCES CITED

The following references are of record in the file of this patent:

UNITED STATES PATENTS

| Number | Name | Date |
|---|---|---|
| 464,359 | Hagan | Dec. 1, 1891 |
| 2,016,489 | Escalante | Oct. 8, 1935 |

FOREIGN PATENTS

| Number | Country | Date |
|---|---|---|
| 268,259 | Italy | Oct. 29, 1929 |